(12) United States Patent
Becker et al.

(10) Patent No.: US 7,713,467 B2
(45) Date of Patent: May 11, 2010

(54) PROCESS FOR THE PRODUCTION OF A BALL SCREW AND BALL SCREW

(75) Inventors: Wolfgang Becker, Waldenbuch (DE); Ralf Branz, Holzgerlingen (DE); Winfried Schroeppel, Eningen u.A. (DE)

(73) Assignee: Danaher Linear GmbH, Wolfschlugen (DE)

( * ) Notice: Subject to any disclaimer, the term of this patent is extended or adjusted under 35 U.S.C. 154(b) by 488 days.

(21) Appl. No.: 11/313,265

(22) Filed: Dec. 19, 2005

(65) Prior Publication Data

US 2006/0156843 A1 Jul. 20, 2006

(30) Foreign Application Priority Data

Dec. 23, 2004 (DE) .................. 10 2004 063 203

(51) Int. Cl.
*B22F 7/00* (2006.01)
(52) U.S. Cl. .................. 419/6; 419/36; 419/38; 419/44; 74/424.82
(58) Field of Classification Search .......... 419/6
See application file for complete search history.

(56) References Cited

U.S. PATENT DOCUMENTS

| | | | |
|---|---|---|---|
| 2,450,282 A | 9/1948 | Jackson | |
| 3,184,987 A | 5/1965 | Beatty | |
| 4,729,789 A * | 3/1988 | Ide et al. | ................ 75/244 |
| 6,033,788 A * | 3/2000 | Cawley et al. | ............ 428/548 |
| 6,464,034 B1 * | 10/2002 | Toda et al. | ................ 180/444 |
| 2003/0213323 A1 | 11/2003 | Hayashi | |

FOREIGN PATENT DOCUMENTS

| | | |
|---|---|---|
| EP | 1 350 988 | 10/2003 |
| EP | 1 026 067 | 12/2003 |
| JP | 06147290 A * | 5/1994 |

OTHER PUBLICATIONS

Jack A. Hamill, "Welding and Joining Processes," ASM Handbook, v. 7, 1998, pp. 656-662.*

* cited by examiner

*Primary Examiner*—Roy King
*Assistant Examiner*—Christopher Kessler
(74) *Attorney, Agent, or Firm*—Lipsitz & McAllister, LLC (57) ABSTRACT

A process for the production of a ball screw, which has at least one element produced powder metallurgically, is suggested, with which the at least one element is produced from a plurality of parts, wherein at least one first precursor body with a first joining area and one second precursor body with a second joining area are produced and the first precursor body and the second precursor body have been or are brought into contact via the first joining area and the second joining area prior to the sintering and/or during the sintering.

17 Claims, 7 Drawing Sheets

PROCESS FOR THE PRODUCTION OF A BALL SCREW AND BALL SCREW

The present disclosure relates to the subject matter disclosed in German application No. 10 2004 063203.0 of Dec. 23, 2004, which is incorporated herein by reference in its entirety and for all purposes.

BACKGROUND OF THE INVENTION

The invention relates to a process for the production of a ball screw.

The invention relates, in addition, to a ball screw.

Ball screws are described, for example, in EP 1 350 988 A1 or U.S. Pat. No. 2,450,282.

SUMMARY OF THE INVENTION

In accordance with the invention, a process for the production of a ball screw is provided which may be carried out in a simple manner and with which reliably functioning ball screws may be produced.

In accordance with an embodiment of the invention, in the process at least one element is produced powder metallurgically, wherein the at least one element is produced from a plurality of parts, wherein at least one first precursor body with a first joining area and one second precursor body with a second joining area are produced and the first precursor body and the second precursor body have been or are brought into contact via the first joining area and the second joining area prior to the sintering and/or during the sintering.

Components may be produced by metal powder sintering which have low dimensional tolerances and have a high strength since the formation of cracks is essentially prevented.

In this respect, a formed part is normally produced from a mixture of metal powder and binding agent and the powder particles in this formed part have a certain cohesion. This formed part is designated as a green compact body. It comprises binding agent, for example, in the order of magnitude of approximately 10% by weight. This green compact body is converted into a brown compact body by way of partial removal of binding agent, for example, chemically or physically (for example, by way of melting). The brown compact body is porous. The brown compact body is then sintered by supplying heat, for example, in a kiln. As a result of the sintering, the porosity decreases and the volume of the workpiece decreases. In addition, the corresponding workpiece is compacted. Moreover, the binding agent is dissolved completely out of it. The workpiece produced has metallic properties.

Sintering is the pelletization (compaction) of fine grained substances due to heat treatment below the melting temperature.

One example of a powder metallurgical production process is powder or metal injection molding (MIM), with which the shaping of the green compact is brought about via (injection) molding. It is also possible to bring about shaping via pressing or provide for a plastic shaping, for example, via extrusion.

It has been shown that when the first precursor body and the second precursor body are in contact with one another during sintering, a one-piece element may be produced as a result from two or more parts. In this respect, a metallurgical joining of the parts is achieved and so no additional connection elements such as screws or bolts are required and also no adhesive material is required.

As a result of the process according to the invention, a one-piece element consisting of a plurality of parts may be produced. As a result, it is possible to provide structures on the at least one element which may not be realized in other types of production or only at considerable cost; in particular, structures may be provided which can otherwise not be produced or only at considerable cost, for example, by way of removal of material by machining or by molding with dead cores. As a result of the process according to the invention, semi-finished parts may be produced separately, wherein these may be provided with recesses which then supplement one another on the finished element to form, for example, a channel structure. In this way, deflector pieces for rolling bodies may, for example, be produced and these are provided with an interior channel which could not otherwise be produced or not economically.

As a result of the process according to the invention, it is also possible to produce elements, with which a plurality of parts are joined to one another integrally and, in particular, metallurgically. For example, deflector elements may be integrated into a threaded nut or threaded spindle. For example, it is also possible to produce a threaded spindle with one or several cavities.

As a result of the process according to the invention, it is also possible to join precursor bodies to one another in that the reduction in volume during the removal of binding agent (in particular, during the conversion of a green compact precursor body to a brown compact precursor body or also during the sintering) is utilized. As a result, one precursor body may be shrunk onto another or a form-locking connection may be achieved, for example, by means of recessed areas. This "volume reduction joining" may also be produced without any metallurgical joining of the precursor bodies being provided.

It is, in principle, possible for the precursor bodies to be joined prior to or during the sintering. As a result of the sintering, a one-piece workpiece results with a metallic joining of the precursor bodies. A joining prior to the sintering may also be carried out, for example, on green compact bodies via friction welding or butt welding.

The first precursor body and the second precursor body are advantageously produced as separate formed parts. During the production of formed parts, the metal powder masses are molded such that at least a minimal cohesion of the powder particles is present. Formed parts may be produced, for example, by way of pressing or by plastic shaping such as extrusion. The production by means of molding or injection molding is also possible.

The first precursor body and the second precursor body are produced, in particular, as separate green compact bodies and/or brown compact bodies. A green compact body is produced, in particular, as a formed part. The green compact body may be given the corresponding shape.

The first precursor body and/or the second precursor body is provided, in particular, with a rolling body guide. This may be realized on a formed part in a simple manner via one or several recesses. The final rolling body guide on the element produced is achieved due to the combination of recesses on the precursor bodies and further machining of the precursor bodies.

At least two green compact precursor bodies are, in particular, produced and these are converted into one or several brown compact precursor bodies and the brown compact precursor body or bodies are sintered.

In this respect, it is possible for the precursor bodies not to be brought into contact until during the sintering. It is, in principle, also possible for the first precursor body and the second precursor body to be brought into contact during the production of the brown compact bodies, i.e., for the green compact precursor bodies to be brought into contact and for the green compact precursor bodies to be in contact during the removal of binding agent. As a result, a combination of brown compact bodies results, in which the precursor bodies may already be joined. In this respect, it is, in principle, possible for joining areas to have been melted prior to the bodies being brought into contact.

It is provided, in particular, for the first precursor body and the second precursor body to be brought into contact during the sintering. For this purpose, separate parts to be sintered, such as brown compact bodies, are, for example, brought into contact prior to the sintering or a combination of brown compact bodies, with which brown compact bodies have already been brought into contact, is sintered.

In principle, it is possible for a first brown compact precursor body and a second brown compact precursor body to be produced separately and for these brown compact precursor bodies to then be brought into contact. During the sintering, a metallurgical joining may be achieved for the production of a one-piece element.

In order to be able to join them, the first precursor body and the second precursor body are, for example, positioned against one another and, in particular, the precursor bodies are brought into contact (via the respective joining areas). For example, the first precursor body is placed against the second precursor body in order to provide contact. As a result, a metallurgical joining may be achieved in a simple manner in order to obtain a one-piece element.

It is advantageous when the first precursor body is joined to the second precursor body as a result of a reduction in volume during the removal of binding agent and/or sintering. As a result, a non-metallurgical connection may be achieved, via which the precursor bodies are, for example, positioned on one another for the sintering. A metallurgical joining may then be provided with this non-metallurgical connection.

It may be provided for a brown compact precursor body and a green compact precursor body to be produced separately and for the precursor bodies to be joined via the conversion of the green compact precursor body to a brown compact body. A brown compact precursor body is produced as a result of removal of binding agent from a green compact precursor body, wherein a reduction in volume occurs. This reduction in volume may be utilized for producing a connection which may also be non-metallurgical. When the green compact precursor body is likewise converted to a brown compact precursor body, it may, for example, be shrunk onto the other precursor body or a form-locking fit may, for example, be provided via recessed areas.

It is particularly advantageous when the green compact precursor body is produced with one or several seats (receptacles) for a connection area of the brown compact precursor body. The brown compact precursor body can then be placed in the seat or seats. When the green compact precursor body has binding agent removed from it, its volume is reduced and a mechanical contact can be provided as a result which leads to a connection; the connection is provided, for example, due to shrinkage. It is also possible for a form-locking fit to be produced in that recessed areas are, for example, provided. In this way, a deflector piece may, for example, be fixed to a threaded nut.

It is favorable when the green compact precursor body is shrunk onto the brown compact precursor body via removal of binding agent and/or a form-locking fit is generated. As a result, a non-metallurgical connection can be achieved, wherein it is possible, in principle, to provide a metallurgical joining as a result of subsequent sintering.

It is particularly advantageous when the first joining area and the second joining area are designed to be adapted to one another such that when correctly positioned against one another the relative movement of the first precursor body and of the second precursor body is blocked at least in one direction. As a result, a fixing in position may be achieved at least in the blocked direction. In addition, the correct positioning may be brought about in a simple manner and also fixed.

The first joining area and the second joining area are, for example, designed to be adapted to one another such that the one joining area has at least one recess, in which an associated contact element of the other joining area can be placed. As a result, an interlocking of contact elements in recesses may be brought about in order to fix the two precursor bodies in position at least with respect to one direction. In this respect, one joining area may have not only one or several recesses but also one or several contact elements. Such contact elements are designed, for example, in the shape of a tongue and may also be designed as dip-in areas.

It is particularly advantageous when the first precursor body and the second precursor body are of the same design. As a result, the production is simplified. For example, the first precursor body and the second precursor body are then produced in the same type of mold (not necessarily the same one).

The at least one element is provided, in particular, with a rolling body guide. This rolling body guide is produced, in particular, by way of partial guides in the precursor bodies, wherein these partial guides are formed, in particular, via recesses. The recesses then supplement one another in the element produced to form the rolling body guide.

For example, the at least one element is a deflector piece for rolling bodies. Such deflector pieces are arranged, for example, on a threaded nut in order to guide rolling bodies back. When a deflector piece is arranged at an end area of a threaded nut, it is advantageous when such a deflector piece has a closed interior guide channel (apart from an entry and exit). Such guide channels are complicated to produce. When they have a corresponding shape, it is, in certain circumstances, not possible to produce them by way of removal of material by machining or by way of molding with a dead core. As a result of the solution according to the invention, optional channel shapes may be fundamentally produced. As a result, the deflection of the rolling bodies may be optimized without being bound to specific shapes via the production process. In addition, it is not necessary to connect parts to one another via additional connection elements such as screws or bolts or adhesive agents in order to produce the element.

It is also possible for the at least one element to be a threaded nut.

One or several deflector elements are, for example, arranged on the threaded nut. The deflector element or elements may be joined to the threaded nut in one piece by means of the process according to the invention.

For example, one or several deflector bars are produced which are arranged on the threaded nut, wherein a metallurgical joining of the one or several deflector bars to the threaded nut is brought about by means of the process according to the invention.

It is also possible for the at least one element to be a threaded spindle.

For example, the threaded spindle has one or several cavities. Such a threaded spindle has a reduced mass which can be of advantage for certain applications. The threaded spindle may be produced from a first precursor body and a second precursor body as respective semi-finished parts, wherein the threaded spindle produced is in one piece with an integrated cavity or integrated cavities.

It is also possible for one or several deflector elements to be arranged on the threaded spindle, wherein a metallurgical joining, in particular, is brought about.

The first precursor body and the second precursor body are joined, in particular, metallurgically, i.e., a metallurgical joining of the (previous) precursor bodies is present in the at least one element produced and so the at least one element is in one piece.

The first precursor body and the second precursor body are joined, in particular, free from screws and free from bolts and free from adhesive. The joining is brought about, for example, during the production of the brown compact bodies and/or the sintering.

In accordance with the invention, a ball screw is provided which can be produced in a simple manner and which functions reliably.

In accordance with an embodiment of the invention, at least one element is provided which is produced powder metallurgically, wherein the at least one element is produced in several parts and the parts are joined metallurgically via a connection area which comprises respective joining areas of the parts.

The ball screw in accordance with the invention has the advantages already explained in conjunction with the production process according to the invention.

Additional advantageous embodiments have likewise already been explained in conjunction with the process according to the invention.

As a result of the metallurgical joining, no additional connection elements such as screws or bolts or adhesive agents are required.

It is favorable when the at least one element has one or several recesses. The recesses may be designed such that rolling bodies can be guided in them.

In particular, the at least one element has one or several guides for rolling bodies. These may be open or closed channels for rolling bodies.

It may be provided, in particular, for the at least one guide to be closed and have an entry and exit. The guide may be a closed channel which is arranged on a one-piece deflector piece. A deflection of rolling bodies for their return guidance may be achieved via such a channel.

For example, the at least one element is a deflector piece.

Such a deflector piece advantageously has an interior guide path for rolling bodies. This path may be produced and optimized in a simple manner with the process according to the invention without any restrictions applying, for example, with respect to removal of material by machining or molding with a dead core.

It is also possible for the at least one element to be a threaded nut.

For example, one or several deflector elements are arranged on the threaded nut. These deflector elements may be arranged in one piece on the threaded nut, wherein a metallurgical joining of the deflector element or elements to the rest of the threaded nut is brought about.

It is likewise possible for the at least one element to be a threaded spindle.

For example, the threaded spindle is a hollow spindle. The hollow spindle has one or several inner cavities. The mass of the threaded spindle is reduced as a result of the cavity or cavities. In accordance with the invention, a metallurgical joining of semi-finished parts of the hollow spindle may be brought about.

It is also possible for one or several deflector elements to be arranged on the threaded spindle and, in this respect, to be integrated, in particular, into the threaded spindle so that the threaded spindle is designed in one piece; the connection is, in this respect, a metallurgical joining.

The following description of preferred embodiments serves to explain the invention in greater detail in conjunction with the drawings.

BRIEF DESCRIPTION OF THE DRAWINGS

FIGS. 7 (*a*), (*b*), (*c*) show schematically various steps for explaining an additional embodiment of the process according to the invention.

DETAILED DESCRIPTION OF THE INVENTION

Figure 1:
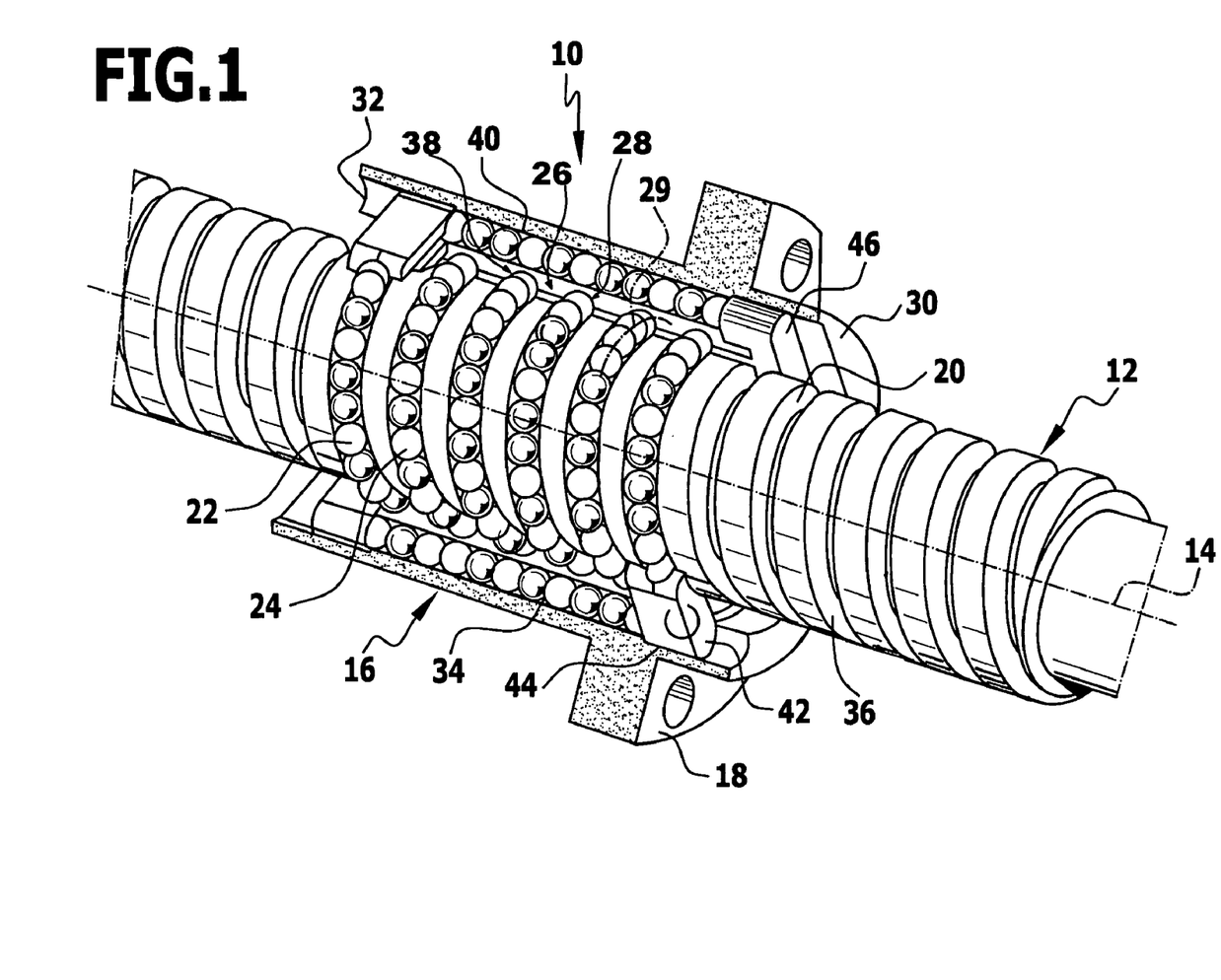
FIG. 1 shows a perspective partial sectional illustration of one embodiment of a ball screw.

One embodiment of a ball screw or rolling body screw, which is shown in FIG. 1 and designated as 10, comprises a threaded spindle 12 which extends along a spindle axis 14. The spindle axis 14 defines an axial direction.

A threaded nut 16 surrounds the threaded spindle 12, wherein the threaded spindle 12 is guided in the threaded nut 16 for rotational displacement. By turning the threaded spindle 12 about the axis 14, the threaded nut 16 may be moved relative to the threaded spindle 12 along the axis 14, wherein the direction of displacement is dependent on the direction of rotation. When the threaded spindle 12 is held so as to be non-translational and is turned about the spindle axis 14, the threaded nut 16 may be displaced parallel to the spindle axis 14 as a result. When the threaded nut 16 is held so as to be non-translational and is turned, the threaded spindle 12 may be displaced parallel to the spindle axis 14 as a result.

The threaded nut 16 is provided with an outer flange 18, via which the threaded nut 16 can be mounted, for example, on a slide. When the threaded spindle 12 is held so as to be non-translational and is driven so as to turn, a slide which is connected to the threaded nut 16 via the flange 18 may be displaced, for example, parallel to the spindle axis 14, wherein the direction of displacement is determined by the direction of rotation of the threaded spindle 12.

The threaded spindle 12 is provided with at least one threaded channel 20 which winds in a helical shape around the spindle axis 14 and in which an endless row 22 of rolling bodies and, in particular, rolling body balls 24 is guided.

The threaded nut 16 has on its inner side 26 facing the threaded spindle 12 a helical threaded channel 28 which is adapted to the threaded channel 20 and in which the rolling body balls 24 likewise engage. The threaded channels 20 and 28 together form, as a result, a guide path for rolling bodies. A ball reference circle 29 of the threaded nut 16 is that guide circle, on which the rolling body balls 24 are guided in the threaded channel 28, wherein the greatest transverse distance in relation to the spindle axis 14 is present in the ball reference circle 29.

In the embodiment shown, at least one return channel 34 is provided for guiding rolling body balls 24 back from a threaded channel area which is located in the vicinity of one end 30 of the threaded nut 16 to a threaded channel area which is located in the vicinity of the other end 32, or vice versa, and, therefore, for closing the endless row 22 of rolling body balls 24. This return channel is embedded in an inner wall of the threaded nut 16 and extends essentially parallel to the axial direction 14.

The ball screw 10 which is shown in FIG. 1 is two-threaded, i.e., the threaded spindle 12 has the threaded channel 20 and a threaded channel 36 offset in relation thereto. Apart from the return channel 34, which provides for the return guidance of the rolling body balls 24 guided in the threaded channels 20, 28, a second return channel 40 is provided which provides for the return guidance of the rolling body balls 24 guided in the threaded channels 36, 38.

The return channels 34 and 40 are formed in the threaded nut 16 in diametrical spaced relation to one another in the embodiment shown. They may, however, also be arranged so as to be offset relative to one another in comparison with an angle of 180°.

A ball screw may also be one-threaded or have a number of threads greater than two.

The direction of guidance of the rolling body balls 24 in the respective return channel 34 and 40 is essentially parallel to the axial direction whereas the direction of guidance in the threaded channels 20, 28 and 36, 38 has a transverse component in relation to the axial direction 14. For this reason, a respective deflector element 42 is provided for transferring the rolling body balls 24 out of the threaded channels 20, 28 and 36, 38, respectively, into the associated return channels 34 and 40, respectively, and vice versa. Two respective deflector elements 42 are associated with each return channel 34 and 40, respectively, for closing the endless row 22 of rolling body balls 24, wherein a first deflector element is positioned in the front end area of the one end 30 and the other deflector element in the front end area of the other end 32 of the threaded nut 16.

The threaded nut 16 comprises for each deflector element 42 a corresponding seat 44, in which the associated deflector element 42 is positioned. Such a seat is formed by a recess in the threaded nut 16 which is accessible from a front side end 30 and 32, respectively, so that the deflector element 42 can be inserted into the seat in a direction parallel to the axial direction 14. The seat 44 is designed so as to be adapted to the deflector element 42 such that its movability in the seat 44 is blocked in each direction transverse to the axial direction 14, i.e., the deflector element 42 is seated in the seat 44 so as to be non-rotational with respect to each potential axis of rotation parallel to the axial axis 14.

A corresponding ball screw with a threaded spindle and with a threaded nut, which each have threaded channels which are adapted to one another and in which rolling bodies are guided, and with one or several return channels for returning rolling bodies with a return direction which is essentially axial, wherein a deflector element is provided for the deflection out of a threaded channel into a return channel or vice versa, and a deflector element and a seat for the deflector element arranged in the threaded nut are designed to be adapted to one another such that the deflector element can be positioned in the seat so as to be non-displaceable with respect to each direction transverse to the axial direction, is described in EP 1 350 988 A, to which reference is expressly made.

A deflector element 42 is designed, in particular, as a deflector piece 46 which is produced separately from the threaded nut 16.

In accordance with the invention, it is provided for at least one element of a ball screw, in particular, a deflector piece and/or a threaded spindle and/or a threaded nut to be produced powder metallurgically. In the case of the ball screw 10, the deflector pieces 46 are, in particular, produced powder metallurgically.

One example of a powder metallurgical process is the metal injection molding (MIM). With this process, a formed part (green compact body) is produced first of all by means of metal powder and binding agent via injection molding; this green compact body is converted into a brown compact body by removing (dissolving out) binding agent. The brown compact body is then sintered, in particular, in a kiln.

The green compact body is produced as an injection molded formed part from a mixture of metal powder and binding agent. Starch, sugar, injectable plastics etc. are used, for example, as binding agent. In the green compact body, binding agent is typically present in a proportion of approximately 10% by weight. In the green compact body, an essentially homogenous powder distribution is present, wherein the powder particles are not aligned.

By partially removing binding agent, for example, by a chemical process or by a physical process (for example, by way of melting), a porous body, the brown compact body, is produced.

The brown compact body is then sintered; as a result, the binding agent is completely removed and the corresponding workpiece is compacted. The sintered part produced in this manner no longer has open pores. Sintering takes place as a general rule without external pressure. The sintered part is a pure metal part.

In order to produce the corresponding element of the ball screw according to the invention, separate precursor bodies are produced in accordance with the invention and these are brought into contact with their corresponding joining areas in the green compact body state and/or in the brown compact body state and/or are in contact with one another during the sintering in order to obtain a metallurgical joining of the parts for the purpose of producing the element.

Figure 2:
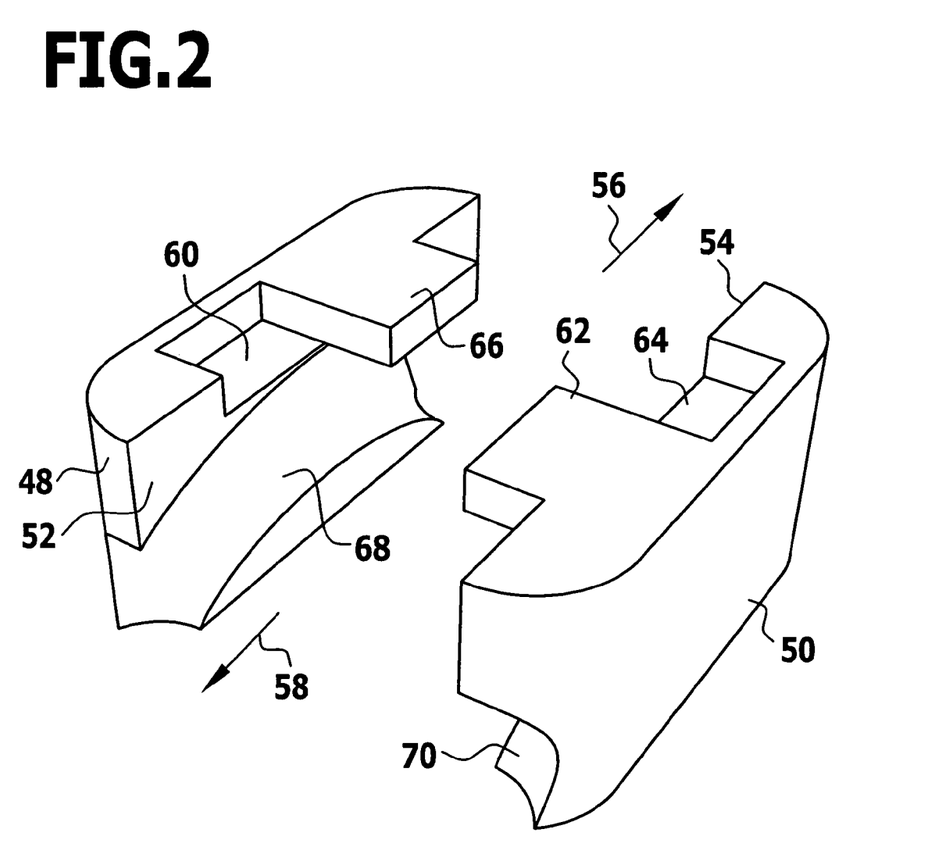
FIG. 2 shows a schematic illustration of a first precursor body and a second precursor body for the production of a deflector piece.

In one embodiment, with which a deflector piece 46 is produced, for example, by way of metal injection molding, a first precursor body 48 and a second precursor body 50 are produced first of all as green compact bodies, as shown schematically in FIG. 2. The two precursor bodies 48 and 50 are each produced as injection molded formed parts.

It may be provided for the two precursor bodies 48, 50 to be of the same design so that the production of formed parts in the same type of mold is possible. It may, however, also be provided for the two precursor bodies 48, 50 to have different geometrical shapes.

The first precursor body 48 has a first joining area 52 for the connection to the second precursor body 50. Accordingly, the second precursor body 50 has a second joining area 54 for the connection to the first precursor body 48. In order to join the two precursor bodies 48, 50, the two joining areas 52 and 54 are brought into contact.

It may be provided for the joining areas 52 and 54 to be designed to be adapted to one another such that during the corresponding positioning of the two precursor bodies 48, 50 against one another a movement of the two precursor bodies 48, 50 away from one another is blocked in at least one direction; for example, the movement is blocked in a direction 56 transverse to the surface normal of joining surfaces of the first joining area 52 and the second joining area 54 (and, therefore, transverse to the direction of joining) and in a direction 58 contrary to the direction 56.

For this purpose, the first joining area 52 comprises, for example, a recess 60, into which a peg-shaped contact element 62 of the second joining area 54 can engage. Furthermore, the second joining area 54 comprises a recess 64, into which a peg-shaped contact element 66 of the first joining area 52 can engage.

When the contact area of the contact element 62 is seated in the recess 60 and the contact area of the contact element 66 is seated in the recess 64, the relative movement of the precursor bodies 48 and 50 in the directions 56 and 58 is blocked due to the engagement on one another of the respective contact areas. As a result, the positioning is fixed at least with respect to the directions 56, 58.

The first precursor body 48 and the second precursor body 50 are each provided with recesses 68, 70 for forming a rolling body guide. The recesses 68, 70 are produced on the formed part. The recesses 68, 70 are areas recessed in relation to a surface and so they can be generated in a formed part in a simple manner.

When the precursor bodies 48, 50 are joined to one another, the recesses 68, 70 form a closed rolling body guide with an entry and an exit for the rolling bodies.

In accordance with the invention, it is provided for the first precursor body 48 and the second precursor body 50 to be joined to one another metallurgically.

Brown compact bodies are produced from the green compact bodies.

In one embodiment, the brown compact bodies are produced from the green compact precursor bodies 48 and 50 separately.

In an alternative embodiment, the two precursor bodies 48, 50 are brought into contact with one another via their joining areas 52, 54 and this green compact body combination is converted into a brown compact body combination. For this purpose, the binding agent is removed, for example, in a chemical process or by melting.

In this respect, it is fundamentally possible for pressure to be exerted, in particular, parallel to the surface normal of joining surfaces of the joining areas 52, 54.

It is, in addition, possible for the joining areas 52, 54 to be melted beforehand (prior to the joining) in accordance with a butt welding process.

The brown compact bodies produced separately or the brown compact body combination is subsequently sintered, wherein the corresponding precursor bodies are in mechanical contact during the sintering via their joining areas 52, 54. Either the brown compact precursor bodies, which are produced separately, are brought into mechanical contact and this combination of brown compact precursor bodies is sintered or the combination of brown compact bodies, with which precursor bodies have already been brought into contact, is sintered.

As a result, a metallurgical bonding results between the individual parts and so the final element, for example, a deflector piece 46 is of a one-piece design and has a connection area which comprises the first joining area 52 and the second joining area 54 of the precursor bodies 48 and 50.

It is evident that, as a result, a good join with good metallurgical properties may be achieved without additional connection elements and, in particular, screws or bolts needing to be used.

As a result of the process according to the invention, rolling body guides may be produced in a deflector piece 46 and these cannot be produced in a workpiece by way of removal of material by machining or can be produced in a molding process with a dead core only at considerable cost. As a result of the process according to the invention, an optimized ball path may be produced in a deflector piece 46 in a simple manner without restrictions with respect to the production possibilities into a surface needing to be taken into consideration.

Recesses may be produced in the precursor bodies 48, 50, which are designed as semi finished bodies, in a simple manner and these recesses then supplement one another on the element produced to form a closed path for rolling bodies.

The joining of the semi finished bodies may be brought about in a simple and inexpensive manner.

An element consisting of more than two precursor bodies may also be produced with the process described.

For example, deflector elements may also be joined to the associated threaded nut or threaded spindle with the process according to the invention.

In a further embodiment (FIG. 3), it is provided for a first precursor body 72 to be produced as a green compact body for forming a threaded nut and, as second precursor body 74, a deflector element to be produced as a green compact body. The first precursor body 72 has a first joining area 76, via which the second precursor body 74 can be connected to the first precursor body 72. Accordingly, the second precursor body 74 has a second joining area 78 which serves for the connection to the first joining area 76. The first joining area 76 and the second joining area 78 are designed to be adapted to one another.

Figure 3:
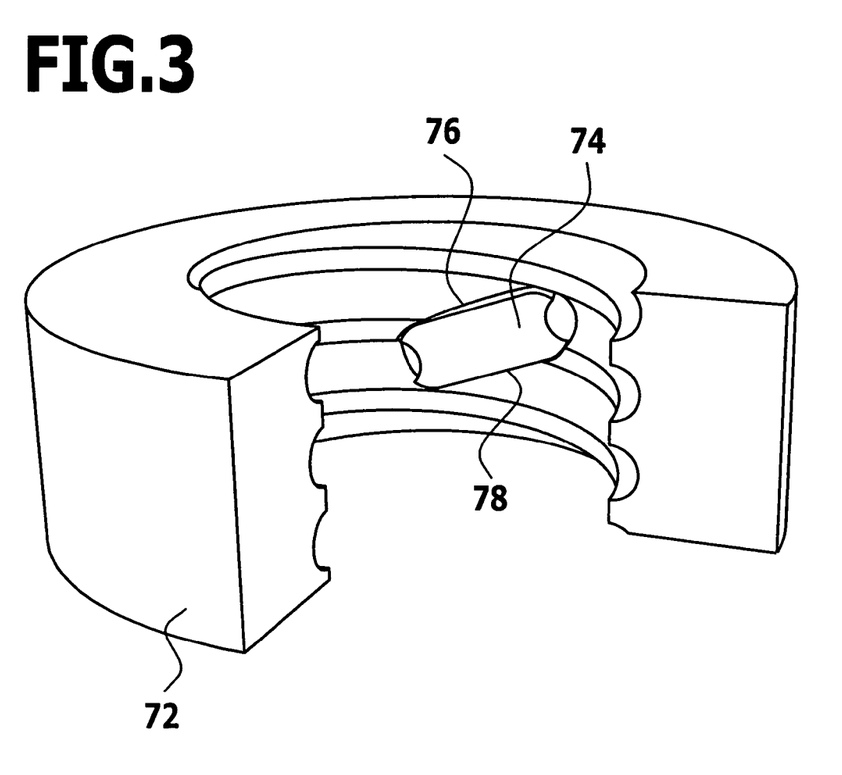
FIG. 3 shows a schematic perspective partial illustration of a threaded nut with integrated deflector element.

The two precursor bodies 72, 74 are brought into contact prior to or following the production of the brown compact bodies and are sintered whilst in contact with one another, as described above on the basis of the production of deflector pieces 46.

As a result, the second precursor body 74 may be joined metallurgically to the first precursor body 72 without screws or bolts being necessary.

A (one-piece) threaded nut is made available as a result, into which one deflector element (or several deflector elements) is integrated for the purpose of deflecting rolling body balls.

A recess for guiding rolling body balls is formed on the second precursor body 74.

In principle, it is possible, on the other hand, for the second precursor body 74 itself to be in several parts and to be, for example, a combination of brown compact bodies.

Figure 4:
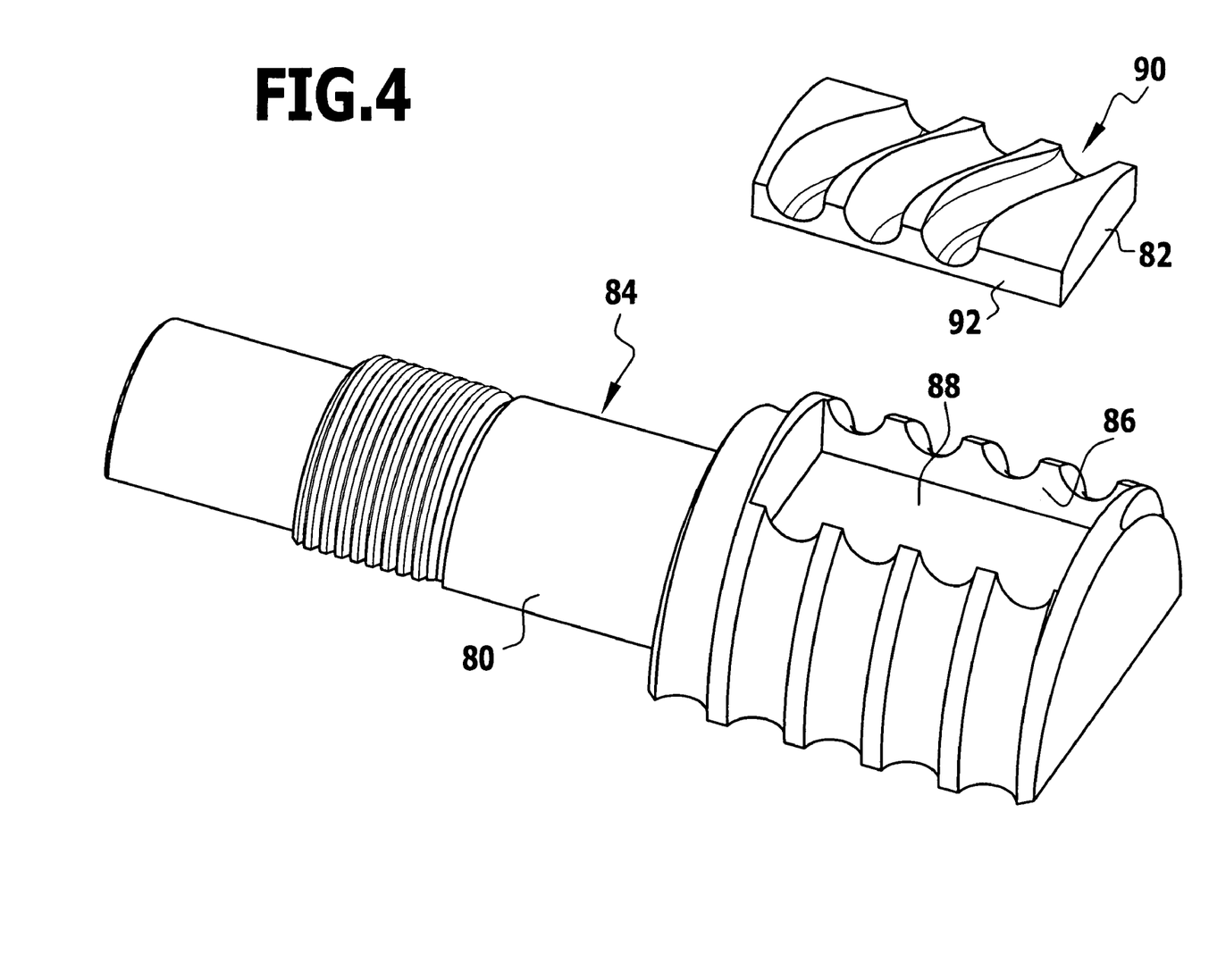
FIG. 4 shows a schematic perspective illustration of a partial section of a threaded spindle precursor body with a deflector element precursor body to be integrated therein.
Figure 5:
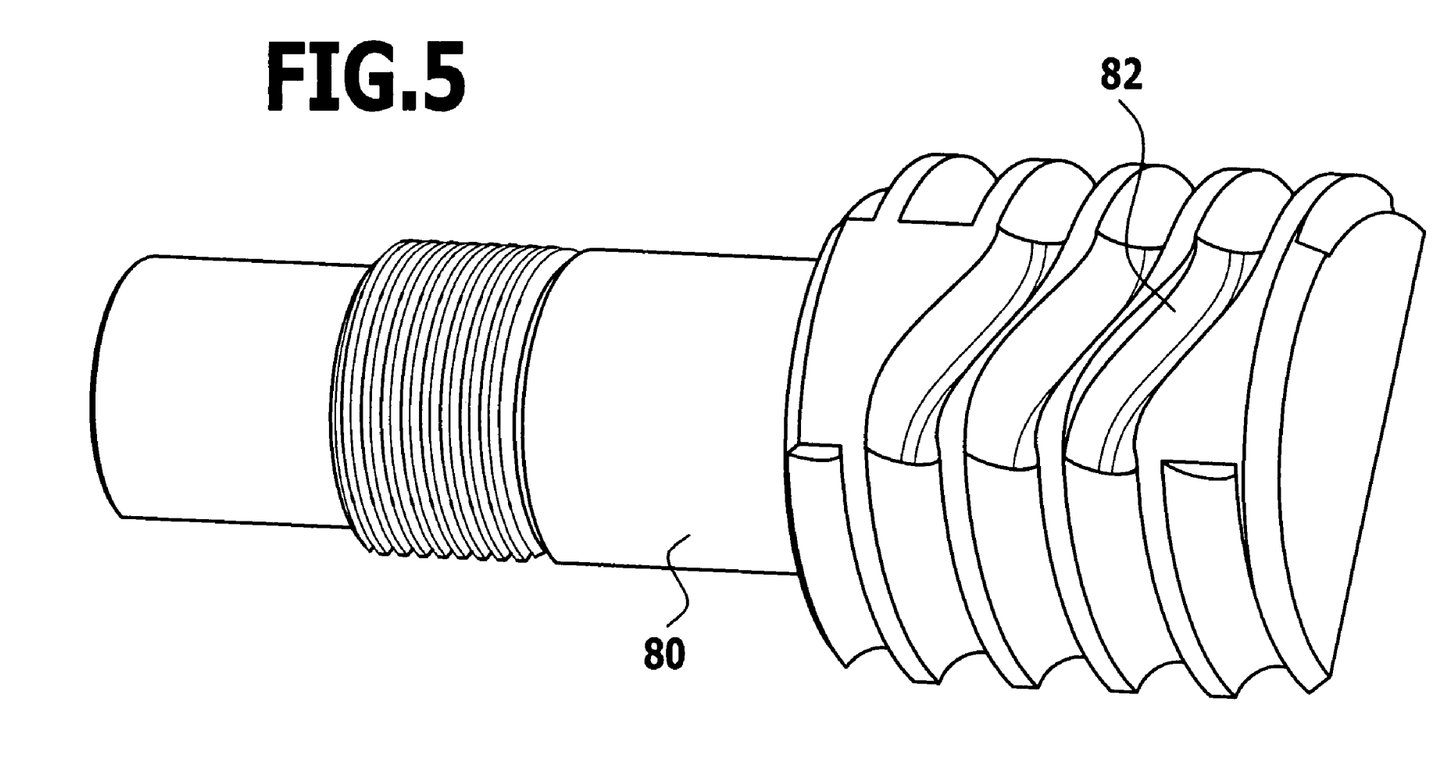
FIG. 5 shows the threaded spindle according to FIG. 4 with an integrated deflector element.

In a further embodiment which is shown schematically in FIGS. 4 and 5, a threaded spindle 80 is produced with one or several deflector elements 82 (FIG. 5).

For this purpose, a green compact threaded spindle is produced as first precursor body 84 and this has an area 86, to which a deflector element is to be fixed in position. A first joining area 88 is formed via the area 86.

Furthermore, a green compact deflector bar is produced as second precursor body 90. This second precursor body 90 has a second joining area 92 which is adapted to the first joining area 88.

The second precursor body 90 and the first precursor body 84 are brought into contact prior to the production of the brown compact bodies or prior to the sintering. For example, the first precursor body 84 is designed such that the second precursor body 90 can be placed on it and is then in its correct position.

The sintering process is subsequently carried out. As a result, a metallurgical joining of the deflector element 82 to the threaded spindle 80 (FIG. 5) results, i.e., a (one-piece) threaded spindle 80 is produced with an integrated deflector element 82 or integrated deflector elements 82.

In a further embodiment (FIG. 6), a threaded spindle is produced from a first precursor body 94 and a second precursor body 96 as element of a ball screw. The two precursor bodies 94, 96 are produced as green compact formed parts.

Figure 6:
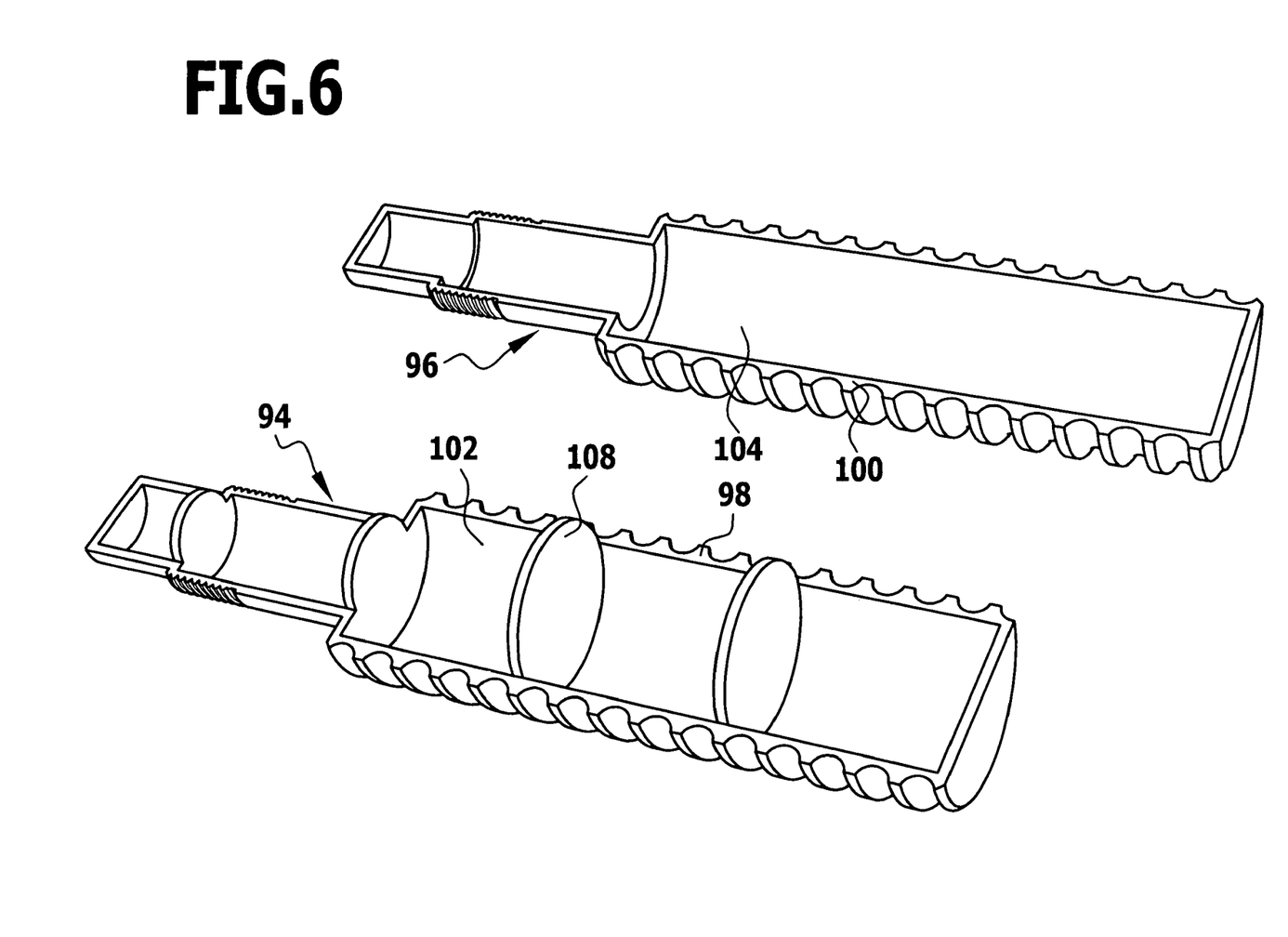
FIG. 6 shows a schematic illustration of a first precursor body and a second precursor body for the production of a hollow spindle.

The first precursor body 94 has a first joining area 98 and the second precursor body 96 has a second joining area 10. The two joining areas 98, 100 are adapted to one another; the two precursor bodies 94, 96 may be joined to one another via these areas in order to produce the threaded spindle.

The first precursor body 94 has one or several recesses 102. Accordingly, the second precursor body 96 has one or several recesses 104. The first precursor body 94 is designed in the shape of a half shell in a threaded area 106 as a result. The same applies for the second precursor body 96.

In this respect, one or several disc elements 108 may be arranged, for example, in the first precursor body 94. These serve for the additional support of the two precursor bodies 94, 96 on one another and, therefore, for increasing the size of joining surfaces of the joining areas 98, 100.

The two precursor bodies 94, 96 are brought into contact with one anther prior to or after the production of the brown compact bodies. They are sintered whilst in contact with one anther. Consequently, a metallurgical joining of the individual parts to one another results.

In this way, a hollow threaded spindle with one or several inner cavities which are not interconnected may be produced, wherein the cavities are formed via the recesses 102 and 104.

Figure 7A:
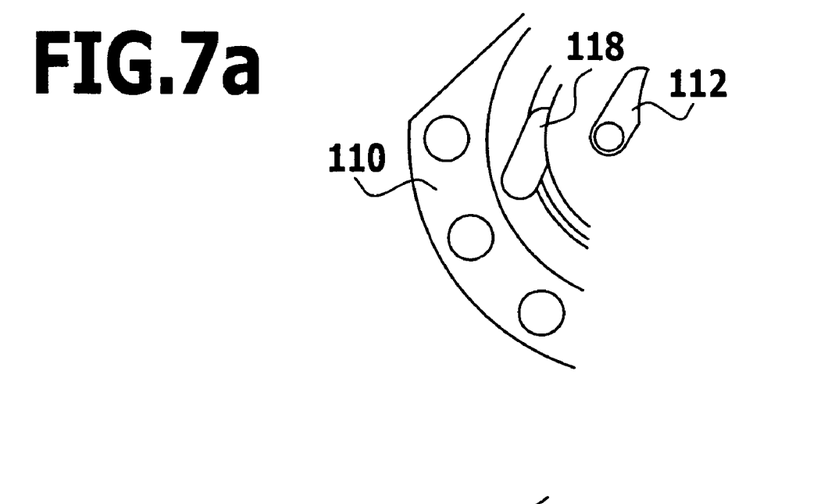
Figure 7B:
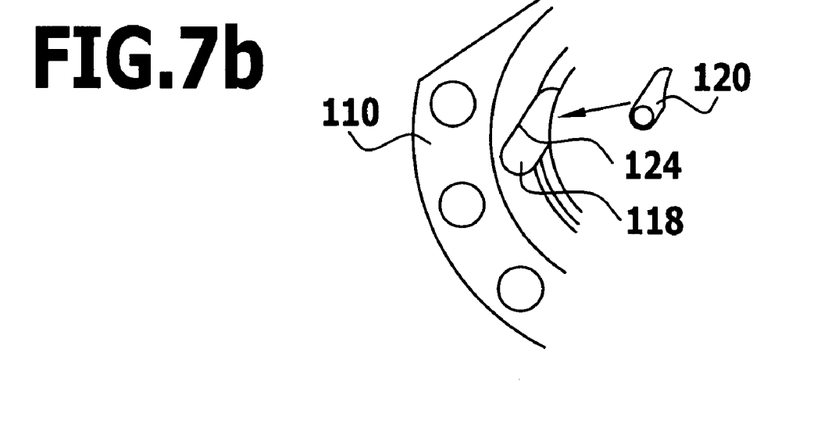
Figure 7C:
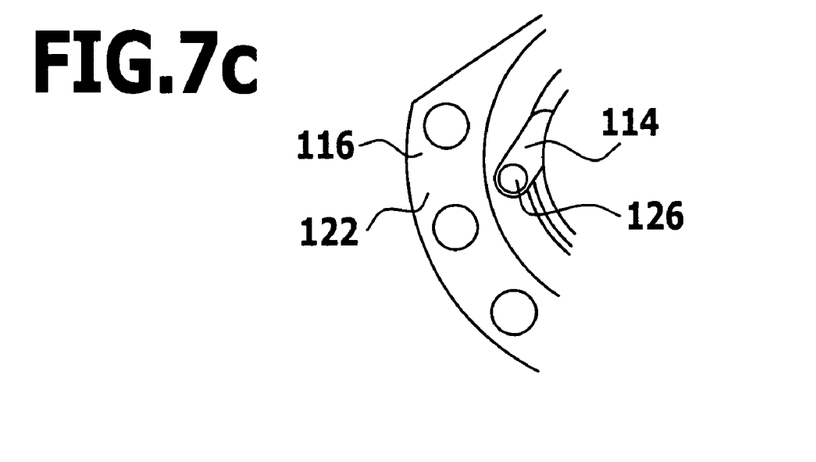

In a further embodiment of the process according to the invention, a first precursor body 110 and a second precursor body 112 are joined by utilizing the decrease in volume during the removal of binding agent (FIGS. 7(*a*) to 7(*c*)).

The process will be explained in conjunction with the joining of a deflector piece 114 to a threaded nut 116 (FIG. 7(*c*)).

The first precursor body 110 is a precursor body for the threaded nut 116. The threaded nut 116 is produced powder metallurgically. The precursor body 110 is produced as a green compact precursor body with a seat 118 for the deflector piece 114.

The second precursor body 112 (the deflector piece precursor body) is likewise produced as a green compact body.

The second precursor body 112 is then converted to a second brown compact precursor body 120 (FIG. 7(*b*)). As a result of the removal of binding agent, a decrease in volume occurs, i.e., the volume of the second brown compact precursor body 120 is smaller than the volume of the second green compact precursor body 112.

The seat 118 of the first precursor body 110 is adapted to the deflector piece 114 in such a manner that the deflector piece is seated in the finished workpiece with an exact fit. As a result of the decrease in volume of the second brown compact precursor body 120 in comparison with the second green compact precursor body 112, the second brown compact precursor body 120 (the deflector piece brown compact precursor body) can be inserted into the seat 118 of the first green compact precursor body 110 (FIG. 7(*b*)).

Subsequently, the first green compact precursor body 110 is converted to a first brown compact precursor body 122 (FIG. 7(*c*)). As a result, a decrease in volume occurs, wherein the decrease in volume also occurs at a joining area 124 of the seat 118. As a result, the first brown compact precursor body may be shrunk onto the second brown compact precursor body 120 in order to obtain a secure join.

The final workpiece 116 may then be produced from this combination of brown compact precursor bodies by way of sintering, wherein during the sintering a metallurgical join is brought about between the deflector piece 114 and the threaded nut 116.

The deflector piece 114 is provided with an entry or exit 126 for rolling bodies.

The invention claimed is:

1. Process for the production of a ball screw, said ball screw having at least one element produced powder metallurgically and being made from a plurality of parts, comprising:
   producing at least one first precursor body with a first joining area and at least one second precursor body with a second joining area; and
   joining the at least one first precursor body and the at least one second precursor body by sintering to produce a one-piece element, the at least one first precursor body and the at least one second precursor body being brought into contact via the first joining area and the second joining area prior to the sintering or during the sintering or prior and during the sintering;
   wherein:
   the one-piece element is a deflector piece for rolling bodies provided with a rolling body guide;
   the at least one first precursor body and the at least one second precursor body are each provided with recesses which, when the precursor bodies are joined, form the rolling body guide as a closed guide with an entry and an exit for the rolling bodies; and
   the first joining area and the second joining area are designed to be adapted to one another such that when correctly positioned against one another prior to or during the sintering the relative movement of the at least one first precursor body and of the at least one second precursor body is blocked at least in one direction.

2. Process as defined in claim 1, wherein the at least one first precursor body and the at least one second precursor body are produced as separate formed parts.

3. Process as defined in claim 1, wherein the at least one first precursor body and the at least one second precursor body are produced as at least one of separate green compact bodies and brown compact bodies.

4. Process as defined in claim 3, wherein the at least one first precursor body and the at least one second precursor body are brought into contact during the production of the brown compact precursor bodies.

5. Process as defined in claim 1, wherein at least two green compact precursor bodies are produced, said bodies being converted to one or several brown compact precursor bodies and the brown compact precursor body or bodies are sintered.

6. Process as defined in claim 1, wherein a first brown compact precursor body and a second brown compact precursor body are produced separately.

7. Process as defined in claim 1, wherein the first joining area and the second joining area are designed to be adapted to one another such that the one joining area has at least one recess, an associated contact element of the other joining area being adapted to be placed in said recess.

8. Process as defined in claim 1, wherein the at least one first precursor body and the at least one second precursor body are of the same design.

9. Process as defined in claim 8, wherein the at least one first precursor body and the at least one second precursor body are produced in the same type of mold.

10. Process as defined in claim 1, wherein:
   the deflector piece is produced by joining one first precursor body and one second precursor body; and a threaded nut is produced by joining a different first precursor body and a different second precursor body by sintering.

11. Process as defined in claim 10, wherein one or several deflector elements are arranged on the threaded nut.

12. Process as defined in claim 11, wherein one or several deflector bars are arranged on the threaded nut.

13. Process as defined in claim 1, wherein:
the deflector piece is produced by joining one first precursor body and one second precursor body; and
a threaded spindle is produced by joining a different first precursor body and a different second precursor body by sintering.

14. Process as defined in claim 13, wherein the threaded spindle has one or several cavities.

15. Process as defined in claim 13, wherein one or several deflector elements are arranged on the threaded spindle.

16. Process as defined in claim 1, wherein the at least one first precursor body and the at least one second precursor body are joined metallurgically.

17. Process as defined in claim 1, wherein the at least one first precursor body and the at least one second precursor body are joined free from screws and free from bolts and free from adhesive.

* * * * *